(12) United States Patent
Gregoryk

(10) Patent No.: US 6,182,721 B1
(45) Date of Patent: Feb. 6, 2001

(54) PRE-CONDITIONED SWIVELING AIR ADAPTER CHUTE

(76) Inventor: Robert J. Gregoryk, 1487 Presidio Dr., Weston, FL (US) 33326

( * ) Notice: Under 35 U.S.C. 154(b), the term of this patent shall be extended for 0 days.

(21) Appl. No.: 09/009,970

(22) Filed: Jan. 21, 1998

(51) Int. Cl.[7] .................................................. B65B 1/04
(52) U.S. Cl. ............................ 141/384; 141/113; 454/119
(58) Field of Search ................... 454/76, 119; 285/148.1, 285/148.23, 148.4; 14/71.5; 141/113, 384

(56) References Cited

U.S. PATENT DOCUMENTS

| | | | |
|---|---|---|---|
| 2,737,401 | * | 3/1956 | Lindsay ........................... 141/384 X |
| 3,399,545 | * | 9/1968 | Anderson et al. ..................... 14/71.5 |
| 4,186,946 | * | 2/1980 | Snow . | |
| 5,355,917 | | 10/1994 | Kofflin ................................. 141/384 |
| 5,664,951 | * | 9/1997 | Clary et al. ....................... 141/384 X |
| 5,740,846 | * | 4/1998 | Larson et al. ..................... 141/113 X |
| 5,927,355 | * | 7/1999 | Kofflin ............................. 141/384 X |

* cited by examiner

Primary Examiner—Harold Joyce

(57) ABSTRACT

A preconditioned air adapter chute for attachment to an aircraft has a duel body that is cylindrical at both ends, and comprised of a stationary body and swivel body. The stationary body is equipped with a locking bar attached to two locking hooks, one on each side of the stationary body. The stationary body includes an adapter nozzle that is cylindrical in shape, and designed to penetrate an aircraft's mounting flange.

1 Claim, 1 Drawing Sheet

PRE-CONDITIONED SWIVELING AIR ADAPTER CHUTE

BACKGROUND

1. Field of Invention

This invention relates to a pre-conditioned air adapter chute for use on an aircraft.

2. Description of Prior Art

Modern day aircraft require air movement in their cabins as they are parked to keep the cabin in a comfortable temperature range. Ground crews attach a hose with a pre-conditioned air adapter chute to the aircraft that connects to a pre-conditioned air handler unit on the ground.

Ground crews currently attach the adapter chute to the aircraft and then activate the air handler unit. In most cases the hose becomes twisted because the adapter chute is stationary and does not swivel. This requires the ground crew to unhook the adapter chute and straighten the hose manually and then re-attach the adapter chute to the aircraft. This procedure results in inefficient use of manpower.

Also, the current air adapter chutes, while connected to the aircraft, do not provide an airtight seal, resulting in loss of airflow into the aircraft. The current adapters are equipped with a rubber seal which when attached to the aircraft sits flush with the mounting flange on the aircraft. This is designed to seal the airflow from the ground unit to the aircraft. In most cases, however, the seal is broken due to wear and tear of the rubber seal on the adapter.

OBJECTS AND ADVANTAGES

Accordingly, several objects and advantages of my invention are:

(a) to provide an adapter chute which, when attached to an aircraft will, through its swivel motion, keep the air hose from becoming twisted;

(b) to provide an adapter chute which, when connected to an aircraft, will provide for little or no air loss from the ground unit to the cabin of the aircraft;

(c) to provide for a lightweight, durable adapter which will provide for longevity of life and ease of use.

Further objects and advantages of my invention will become apparent from a consideration of the drawings and ensuing description.

DRAWING FIGURES

SUMMARY

Figure 1:
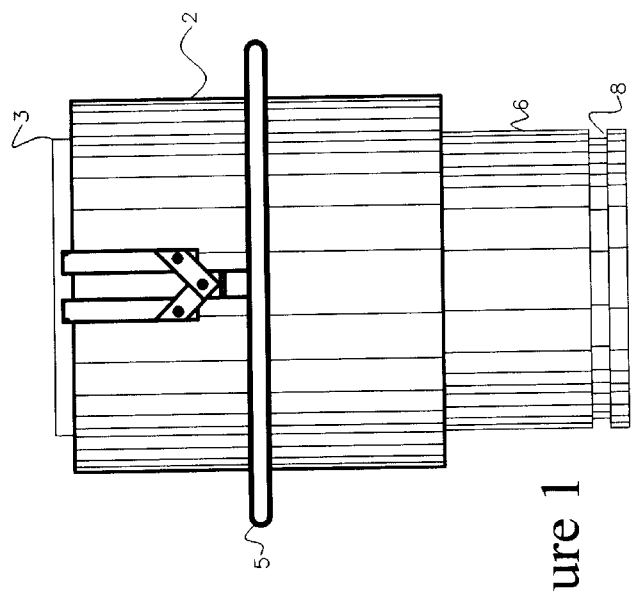
FIG. 1 shows the side view of the air adapter chute in a vertical position.
Figure 3:
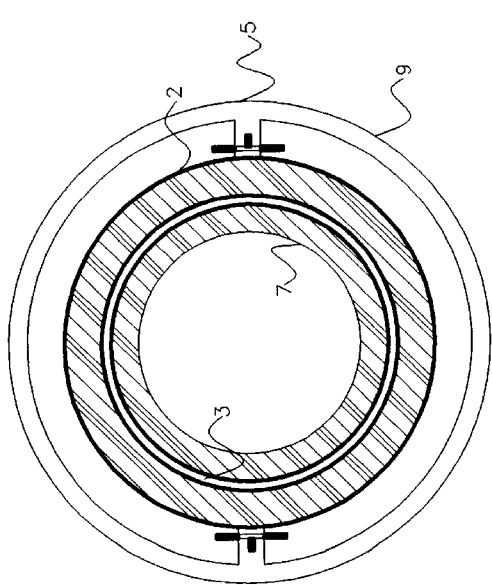
FIG. 3 shows a top view of the air adapter of the present invention.
Figure 2:
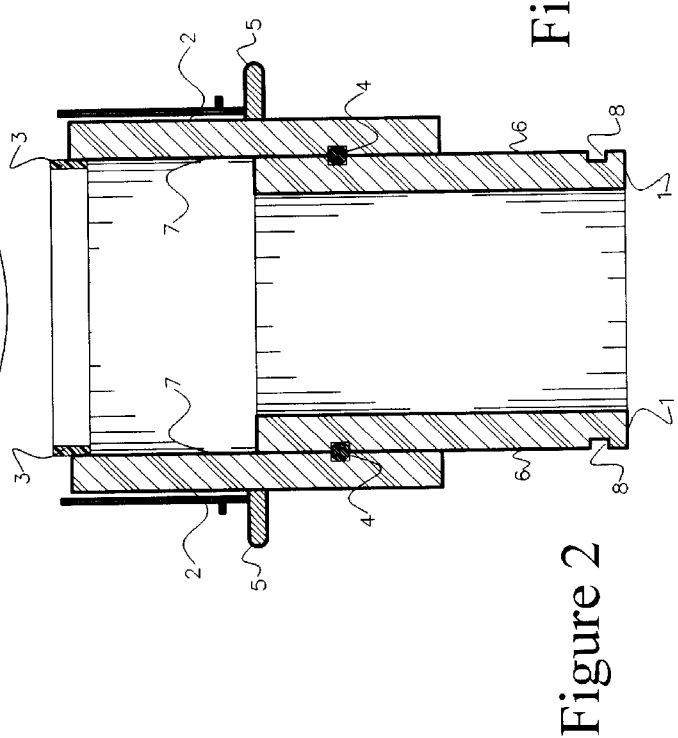
FIG. 2 shows the mechanism that illustrates how the adapter swivels.

My invention is an air adapter chute which contains a swivel base to keep the attached air hose from becoming twisted and also provides an adapter nozzle which is inserted into the mounting flange of an aircraft, which will minimize or eliminate air loss.

The adapter chute has a stationary base (#2) and a swivel tube (#1) which is hollow at both ends. The stationary body is made out of polyvinyl chloride as well as the swivel body is all the same material. The connected with a plastic coated cable (#4) which locks the stationary body (#2) and swivel body (#1) on together. The snout end has an adapter nozzle (#3) made of semi rigid flat rubber stock, attached to the snout end used a gasket between the aircraft and air adapter chute. The bell end of the adapter has a grove (#8) to attach the hose from the ground unit. The locking mechanism (#5) is made of round tubing, which is formed, to the attached adapter chute to be used to hold adapter to aircraft and air hose.

CONCLUSION, RAMIFICATIONS, AND SCOPE OF INVENTION

Accordingly, the reader can see that this adapter chute will serve to provide an unrestricted airflow from the ground unit to the aircraft due to the swivel feature of the adapter chute. The swivel body will position the air hose so that the airflow is not restricted.

In addition, the adapter nozzle, when inserted into the mounting flange of the aircraft, will help promote greater airflow into the aircraft.

Furthermore, the locking bar, due to its one step procedure, provides an easier method of stabilizing the adapter chute to the mounting flange.

While my above description contains many specificities, these should not be construed as limitations on the scope of the invention but rather as an exemplification of one preferred embodiment thereof. For example, other materials can be used in the making of this product, and while the diameters of the nozzle, swivel body and stationary body cannot change, the length of these items could vary from the specifications illustrated. In addition, the swivel design is by no means limited to the specific method described herein. Any design that incorporates swivel motion may be suitable for use with this adapter chute. Also, the swivel gasket could be changed to a different material. Also, the adapter nozzle can be connected or associated with its adjacent elements in a different manner.

Thus the scope of this invention should be determined by the appended claims and their legal equivalents, rather than by the examples given.

I claim:

1. A preconditioned air adapter chute wherein said chute is being connected to an aircraft, to a preconditioned air unit located on the ground, a flexible conduit connecting said air unit to said chute, said adapter chute comprising;

(a) a stationary body said body, being hollow and cylindrical in shape with a recessed groove on the lower interior wall of the stationary body;

(b) a swivel body being hollow and cylindrical in shape with a recessed groove on the outer wall of swivel body; the swivel body being connected to the adapter body with a swivel mechanism, said swivel mechanism utilizing said recessed groove of the adapter body and said recessed groove of the swivel body;

(c) an adapter nozzle, being cylindrical and hollow in shape connected to the inside interior wall of the upper portion of stationary body, for attachment to the said aircraft;

(d) a locking mechanism attached to the upper outer wall of the stationary body, said mechanism comprised of two hooks, one on each side of the stationary body, said hooks being right angled in shape and connected by a common locking bar on said aircraft, said locking bar being perpendicular to the hooks;

(e) a clamp groove located on the bottom exterior wall of the swivel body, said clamp groove extending the entire circumference of the bottom exterior wall of the swivel body, the clamp groove used to facilitate the attachment of the swivel body to the flexible hose whereby preconditioned air may be supplied to said aircraft.

* * * * *